(12) United States Patent
Yasuda et al.

(10) Patent No.: US 11,952,646 B2
(45) Date of Patent: Apr. 9, 2024

(54) GRAIN-ORIENTED ELECTRICAL STEEL SHEET HAVING EXCELLENT INSULATION COATING ADHESION WITHOUT FORSTERITE COATING

(71) Applicant: NIPPON STEEL CORPORATION, Tokyo (JP)

(72) Inventors: Masato Yasuda, Tokyo (JP); Yoshihiro Arita, Tokyo (JP); Masaru Takahashi, Tokyo (JP); Yoshiyuki Ushigami, Tokyo (JP); Shohji Nagano, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 177 days.

(21) Appl. No.: 17/422,219

(22) PCT Filed: Jan. 16, 2020

(86) PCT No.: PCT/JP2020/001188
§ 371 (c)(1),
(2) Date: Jul. 12, 2021

(87) PCT Pub. No.: WO2020/149344
PCT Pub. Date: Jul. 23, 2020

(65) Prior Publication Data
US 2022/0081744 A1    Mar. 17, 2022

(30) Foreign Application Priority Data
Jan. 16, 2019 (JP) .................. 2019-005395

(51) Int. Cl.
| | |
|---|---|
| *C22C 38/06* | (2006.01) |
| *C21D 8/02* | (2006.01) |
| *C22C 38/00* | (2006.01) |
| *C22C 38/02* | (2006.01) |
| *C22C 38/04* | (2006.01) |
| *B82Y 30/00* | (2011.01) |

(52) U.S. Cl.
CPC ............ *C22C 38/06* (2013.01); *C21D 8/0205* (2013.01); *C21D 8/0236* (2013.01); *C21D 8/0257* (2013.01); *C21D 8/0284* (2013.01); *C22C 38/001* (2013.01); *C22C 38/02* (2013.01); *C22C 38/04* (2013.01); *B82Y 30/00* (2013.01); *C21D 2201/05* (2013.01)

(58) Field of Classification Search
CPC . B82Y 30/00; C21D 1/26; C21D 1/76; C21D 2201/05; C21D 8/0205; C22C 38/001; C22C 38/02; C22C 38/04; C22C 38/06; C23C 22/08; C23C 22/74; H01F 1/14783; H01F 1/18
USPC ......................................................... 420/103
See application file for complete search history.

(56) References Cited

U.S. PATENT DOCUMENTS

| | | | |
|---|---|---|---|
| 3,856,568 A | 12/1974 | Tanaka et al. | |
| 3,905,842 A | 9/1975 | Grenoble | |
| 3,905,843 A | 9/1975 | Fiedler | |
| 4,994,120 A | 2/1991 | Takahashi et al. | |
| 5,185,216 A * | 2/1993 | Tanaka ..................... | C25D 7/10 428/614 |
| 5,885,371 A | 3/1999 | Komatsubara et al. | |
| 6,740,426 B2 * | 5/2004 | Kawachi ............... | B32B 15/013 428/645 |
| 2003/0180553 A1 | 9/2003 | Shigesato et al. | |
| 2020/0123626 A1 | 4/2020 | Takebayashi et al. | |
| 2020/0208235 A1 | 7/2020 | Yamamoto et al. | |
| 2021/0027922 A1 | 1/2021 | Yasuda et al. | |

FOREIGN PATENT DOCUMENTS

| | | |
|---|---|---|
| EP | 0 565 029 A1 | 10/1993 |
| EP | 0 959 142 A2 | 11/1999 |
| JP | 48-39338 A | 6/1973 |
| JP | 60-131976 A | 7/1985 |
| JP | 1-230721 A | 9/1989 |
| JP | 1-283324 A | 11/1989 |
| JP | 6-184762 A | 7/1994 |
| JP | 7-278670 A | 10/1995 |
| JP | 7-278833 A | 10/1995 |
| JP | 10-140243 A | 5/1998 |
| JP | 11-106827 A | 4/1999 |
| JP | 2002-173715 A | 6/2002 |
| JP | 2002-348643 A | 12/2002 |

* cited by examiner

*Primary Examiner* — Jie Yang
(74) *Attorney, Agent, or Firm* — Birch, Stewart, Kolasch & Birch, LLP

(57) ABSTRACT

Provided is a grain-oriented electrical steel sheet including a base steel sheet, an intermediate layer which is disposed in contact with the base steel sheet and mainly includes silicon oxide, and an insulation coating which is disposed in contact with the intermediate layer and mainly includes phosphate and colloidal silica, in which the base steel sheet contains predetermined chemical composition, BN having an average particle size of 50 to 300 nm is present, when an emission intensity of B is measured using glow discharge emission analysis, predetermined conditions are satisfied, and a ratio of a major axis to a minor axis of BN is 1.5 or less.

2 Claims, No Drawings

GRAIN-ORIENTED ELECTRICAL STEEL SHEET HAVING EXCELLENT INSULATION COATING ADHESION WITHOUT FORSTERITE COATING

TECHNICAL FIELD

The present invention relates to a grain-oriented electrical steel sheet that has an intermediate layer mainly composed of silicon oxide on a surface of a finally-annealed grain-oriented silicon steel sheet, which is manufactured under conditions that inhibit formation of a forsterite coating, or is produced by removing a forsterite coating by means such as grinding or pickling, or by flattening the surface until it exhibits a mirror gloss, and has an insulation coating mainly composed of phosphate and colloidal silica on the intermediate layer. In particular, the present invention relates to a grain-oriented electrical steel sheet having excellent strongly bending workability and excellent manufacturability of a wound iron core. Priority is claimed on Japanese Patent Application No. 2019-005395, filed Jan. 16, 2019, the content of which is incorporated herein by reference.

BACKGROUND ART

A grain-oriented electrical steel sheet is a soft magnetic material and is used for an iron core of electrical equipment such as a transformer. A grain-oriented electrical steel sheet contains about 7% by mass or less of Si, and the crystal grains are strongly aligned in the {110}<001> direction in Miller indices.

One of characteristics required by a grain-oriented electrical steel sheet is that an energy loss when excited by alternating current, that is, the iron loss, be small. Further, when a grain-oriented electrical steel sheet is used for an iron core material of a transformer, it is essential to secure insulation characteristics for the steel sheet, and thus an insulation coating is formed on a surface of the steel sheet. For example, a method disclosed in Patent Document 1 in which a coating agent mainly composed of colloidal silica and phosphate is applied to a surface of a steel sheet and baked to form an insulation coating is effective in ensuring insulation. In this way, it is a general grain-oriented electrical steel sheet and a manufacturing method thereof to form an insulation coating mainly composed of colloidal silica and phosphate on a forsterite ($Mg_2SiO_4$)-based coating (may be hereinafter simply referred to as a "glass film" or a "forsterite coating") generated in a final annealing process.

Under such circumstances, in recent years, efficiency regulations for a transformer using grain-oriented electrical steel sheets has been implemented due to growing awareness of global environmental problems such as global warming. Conventionally, strict efficiency regulations have been implemented in applications that have been using low grade grain-oriented electrical steel sheets, especially in a wound iron core transformer, and the movement to using higher-grade grain-oriented electrical steel sheets is spreading. For this reason, there is an increasing demand for further reduction in iron loss of a grain-oriented electrical steel sheet.

For the above reason, characteristics required for a grain-oriented electrical steel sheet used for a wound iron core are that (A) the iron loss be low, and (B) the insulation coating does not peel off at a strongly bent processing part. Since a wound iron core is manufactured by winding an elongated steel sheet into a coil shape, there is a problem that a radius of curvature of a steel sheet on an inner circumferential side thereof becomes small, which causes a strongly bent processing, and thus the insulation coating may peel off.

Regarding the above (A), in order to further reduce the iron loss with respect to a general grain-oriented electrical steel sheet, it is important to eliminate a pinning effect due to unevenness of an interface of a glass film on a surface of the steel sheet that hinders control of orientation of crystal grains and movement of magnetic domains (hereinafter, may be referred to as "mirror finishing" and "smoothing").

First, an abnormal grain growth phenomenon called secondary recrystallization is used to control the orientation of crystal grains. In order to accurately control the secondary recrystallization, it is important to accurately form a structure (a primary recrystallization structure) obtained by primary recrystallization before the secondary recrystallization, and appropriately precipitate fine precipitates or intergranular segregation elements called inhibitors.

In the secondary recrystallization, since the inhibitor has a function of inhibiting growth of crystal grains other than the {110}<001> orientation in the primary recrystallization structure and preferentially growing the crystal grains in the {110}<001> orientation, adjustment of a type and an amount of the inhibitor is of particular importance.

Many research results have been disclosed regarding inhibitors. Among them, one of distinctive techniques is a technique that utilizes B as an inhibitor. Patent Documents 2 and 3 disclose that solid solution B functions as an inhibitor and is effective in developing the {110}<001> orientation.

Patent Documents 4 and 5 disclose that fine BN formed by nitriding a material to which B is added after cold rolling functions as an inhibitor and is effective in developing the {110}<001> orientation.

Patent Document 6 discloses that extremely fine BN obtained by inhibiting precipitation of BN as much as possible in hot rolling to precipitate in a subsequent heating process for annealing has a function as an inhibitor. Patent Documents 6 and 7 disclose a method of controlling a precipitation form of B in a hot rolling process to exert a function as an inhibitor.

Next, in order to eliminate a pinning effect due to unevenness of an interface of a glass film on a surface of a steel sheet that hinders movement of magnetic domains, for example, Patent Documents 7 to 9 disclose that a dew point of decarburization annealing is controlled and Fe-based oxides ($Fe_2SiO_4$, FeO, etc.) are not formed in an oxide layer formed during decarburization annealing, and that a substance such as alumina that does not react with silica is used as an annealing separator to achieve surface smoothing after final annealing.

Regarding the above (B), since a general grain-oriented electrical steel sheet having an insulation coating on a glass film generated in a final annealing process has good insulation coating adhesion, the insulation coating adhesion does not become an issue. However, in a case in which a glass film is removed, or a glass film is not formed in a final annealing process intentionally, it is difficult to obtain good insulation coating adhesion, and thus improvement of insulation coating adhesion is an issue.

Therefore, as a technique for ensuring insulation coating adhesion in a grain-oriented electrical steel sheet that does not have a glass film, a method of forming an oxide layer on a surface of a final-annealed grain-oriented silicon steel sheet before forming an insulation coating has been proposed, for example, in Patent Documents 10 to 13.

For example, the technique disclosed in Patent Document 11 is a method in which a final-annealed grain-oriented silicon steel sheet produced by mirror finishing or produced in a state close to having a mirror surface is annealed at a specific atmosphere at each of temperatures to form an externally oxidized layer on a surface of a steel sheet, and the adhesion between the insulation coating and the steel sheet is secured due to the oxide layer.

The technique disclosed in Patent Document 12 is a technique in which in the case of a crystalline insulation coating, an amorphous oxide base coating is formed on a surface of a final-annealed grain-oriented silicon steel sheet that does not have an inorganic mineral coating to prevent the steel sheet from being oxidized when the crystalline insulation coating is formed.

The technique disclosed in Patent Document 13 is a method for further developing the technique disclosed in Patent Document 11, in which a layer structure of a metal oxide layer containing Al, Mn, Ti, Cr, and Si is controlled at an interface between an insulation coating and a steel sheet to improve the adhesion of the insulation coating.

However, the grain-oriented electrical steel sheets that do not have a forsterite coating proposed in Patent Documents 10 to 13 are also based on Al-based inhibitors and do not mention improvement of the insulation coating adhesion in the grain-oriented electrical steel sheets to which B is added disclosed in Patent Documents 2 to 6. Although a grain-oriented electrical steel sheet without a forsterite coating to which B is added has a low iron loss, there still remains a problem in the insulation coating adhesion required for a wound iron core.

CITATION LIST

Patent Document

[Patent Document 1]
  Japanese Unexamined Patent Application, First Publication No. S48-039338
[Patent Document 2]
  Specification of U.S. Pat. No. 3,905,842
[Patent Document 3]
  Specification of U.S. Pat. No. 3,905,843
[Patent Document 4]
  Japanese Unexamined Patent Application, First Publication No. H01-230721
[Patent Document 5]
  Japanese Unexamined Patent Application, First Publication No. H01-283324
[Patent Document 6]
  Japanese Unexamined Patent Application, First Publication No. H10-140243
[Patent Document 7]
  Japanese Unexamined Patent Application, First Publication No. H07-278670
[Patent Document 8]
  Japanese Unexamined Patent Application, First Publication No. H11-106827
[Patent Document 9]
  Japanese Unexamined Patent Application, First Publication No. 2002-173715
[Patent Document 10]
  Japanese Unexamined Patent Application, First Publication No. S60-131976
[Patent Document 11]
  Japanese Unexamined Patent Application, First Publication No. H06-184762
[Patent Document 12]
  Japanese Unexamined Patent Application, First Publication No. H07-278833
[Patent Document 13]
  Japanese Unexamined Patent Application, First Publication No. 2002-348643

SUMMARY OF THE INVENTION

Problems to be Solved by the Invention

A grain-oriented electrical steel sheet having a low iron loss without a forsterite coating has been obtained as a material for an iron core using the above-mentioned conventional techniques, but when a transformer, particularly a wound iron core transformer is manufactured, there is a problem that the insulation coating peels off at a strongly bent processing part on an inner circumferential side of the steel sheet, and this problem has not been solved yet. While high-efficiency transformers are required, the above-mentioned problem awaits resolution in order to industrially manufacture high-efficiency transformers.

The present invention has been made in view of the current state of the conventional techniques, a technical problem thereof being to inhibit peeling off of an insulation coating generated at a strongly bent processing part of a steel sheet serving as an inner circumferential side of an iron core in an grain-oriented electrical steel sheet having a low iron loss that uses BN as an inhibitor and does not have a forsterite coating, which is used as an iron core material for a transformer, especially a wound iron core transformer, and an object thereof is to provide a grain-oriented electrical steel sheet which has excellent insulation coating adhesion and has a low iron loss, which solves the above problem.

Means for Solving the Problem

In a grain-oriented electrical steel sheet having a low iron loss that uses BN as an inhibitor and does not have a forsterite coating, in order to improve the insulation coating adhesion, it is important to strongly align crystal grains in the $\{110\}<001>$ orientation in secondary recrystallization to increase the magnetic flux density and control a precipitation form of B in a steel sheet.

In the case of using BN as an inhibitor, when BN after final annealing is precipitated over the entire thickness of the steel sheet, a hysteresis loss increases to make it difficult to obtain a grain-oriented electrical steel sheet having a low iron loss, and the insulation coating adhesion also becomes inferior.

Based on these facts, the present inventors have diligently studied a method for solving the above problems. As a result, in a grain-oriented electrical steel sheet that does not have a forsterite coating, it has been found that the above problems can be solved by precipitating B as fine spherical BN on a surface layer of a steel sheet containing an oxide layer mainly composed of silicon oxide.

The present invention has been made based on the above finding, and the gist thereof is as follows.

(1) A grain-oriented electrical steel sheet including a base steel sheet, an intermediate layer which is disposed in contact with the base steel sheet and mainly composed of silicon oxide, and an insulation coating which is disposed in contact with the intermediate layer and mainly composed of phosphate and colloidal silica, in which the base steel sheet has, as a chemical composition, by mass %: C: 0.085% or less, Si: 0.80 to 7.00%, Mn: 0.05 to 1.00%, acid-soluble Al: 0.010 to 0.065%, N: 0.0040% or less, S: 0.0100% or less, B: 0.0005 to 0.0080%, and a remainder of Fe and impurities, BN having an average particle size of 50 to 300 nm is present on a surface layer of the intermediate layer, when a total thickness of the base steel sheet and the intermediate layer is defined as d, a time until a sputtering depth reaches a position of d/100 from an outermost surface of the intermediate layer when an emission intensity of B is measured using glow discharge emission spectrometry (GDS) is defined as t(d/100), and a time until the sputtering depth reaches a position of d/10 from the outermost surface of the intermediate layer is defined as t(d/10), an emission intensity $I_{B\_t(d/100)}$ of B at t(d/100) and an emission intensity $I_{B\_t(d/10)}$ of B at t(d/10) satisfy the following Equation (1), and a ratio of a major axis to a minor axis of BN is 1.5 or less.

$$I_{B\_t(d/100)} > I_{B\_t(d/10)} \quad \text{Equation (1)}$$

(2) The grain-oriented electrical steel sheet according to the above (1), in which a number density of BN on the surface layer of the intermediate layer is $2 \times 10^6$ pieces/mm$^2$ or more.

Effects of the Invention

According to the present invention, in a grain-oriented electrical steel sheet using BN as an inhibitor, it is possible to inhibit peeling off of an insulation coating generated at a strongly bent processing part of a steel sheet serving as an inner circumferential side of an iron core, and it is possible to stably provide a grain-oriented electrical steel sheet having excellent insulation coating adhesion, a low iron loss, and excellent manufacturability of a wound steel core.

Embodiments for Implementing the Invention

A grain-oriented electrical steel sheet having excellent insulation coating adhesion without a forsterite coating of the present invention (may be hereinafter simply referred to as an "electrical steel sheet of the present invention") includes a base steel sheet, an intermediate layer which is disposed in contact with the base steel sheet and mainly composed of silicon oxide, and an insulation coating which is disposed in contact with the intermediate layer and mainly composed of phosphate and colloidal silica, in which the base steel sheet contains, as a chemical composition, by mass %: C: 0.085% or less, Si: 0.80 to 7.00%, Mn: 0.05 to 1.00%, acid-soluble Al: 0.010 to 0.065%, N: 0.0040% or less, S: 0.0100% or less, B: 0.0005 to 0.0080%, and a remainder of Fe and impurities, BN having an average particle size of 50 to 300 nm is present on a surface layer of the intermediate layer, when a total thickness of the base steel sheet and the intermediate layer is defined as d, a time until a sputtering depth reaches a position of d/100 from an outermost surface of the intermediate layer when an emission intensity of B is measured using glow discharge emission spectrometry (GDS) is defined as t(d/100), and a time until the sputtering depth reaches a position of d/10 from the outermost surface of the intermediate layer is defined as t(d/10), an emission intensity $I_{B\_t(d/100)}$ of B at t(d/100) and an emission intensity $I_{B\_t(d/10)}$ of B at t(d/10) satisfy the following Equation (1), and a ratio of a major axis to a minor axis of BN in the surface layer of the intermediate layer is 1.5 or less.

$$I_{B\_t(d/100)} > I_{B\_t(d/10)} \quad \text{Equation (1)}$$

Also, the grain-oriented electrical steel sheet of the present invention is characterized in that the number density of BN on the surface layer of the intermediate layer is $2 \times 10^6$ pieces/mm$^2$ or more.

First, in the electrical steel sheet of the present invention, the reason for limiting the chemical composition of the base steel sheet will be described. Hereinafter, "%" means "mass %" unless otherwise specified.

<Component Composition of Base Steel Sheet (Chemical Composition)>

C: 0.085% or Less

C is an element that is effective in controlling a primary recrystallization structure, but since it adversely affects magnetic characteristics, it is an element that is removed by decarburization annealing before final annealing. If it exceeds 0.085% in a final product, age precipitation will occur and a hysteresis loss will increase, and thus C is set to 0.085% or less. C is preferably 0.070% or less, and more preferably 0.050% or less.

A lower limit thereof includes 0%, but if C is reduced to less than 0.0001%, manufacturing costs will increase significantly, and thus 0.0001% is an actual lower limit for a practical steel sheet. Also, in the grain-oriented electrical steel sheet, C is usually reduced to about 0.001% or less by decarburization annealing.

Si: 0.80 to 7.00%

Si is an element that increases electrical resistance of the electrical steel sheet and improves iron loss characteristics. If it is less than 0.80%, γ transformation occurs during final annealing and the crystal orientation of the steel sheet is impaired, and thus Si is set to 0.80% or more. Si is preferably 1.50% or more, and more preferably 2.50% or more.

On the other hand, if Si exceeds 7.00%, workability deteriorates and cracks occur during rolling, and thus Si is set to 7.00% or less. It is preferably 5.50% or less, and more preferably 4.50% or less.

Mn: 0.05 to 1.00%

Mn is an element that prevents cracks during hot rolling and is combined with S to form MnS that functions as an inhibitor. If Mn is less than 0.05%, the addition effect is not sufficiently exhibited, and thus Mn is set to 0.05% or more. It is preferably 0.07% or more, and more preferably 0.09% or more.

On the other hand, if Mn exceeds 1.00%, the precipitation and dispersion of MnS become non-uniform, a required secondary recrystallization structure cannot be obtained, and the magnetic flux density decreases, and thus Mn is set to 1.00% or less. Mn is preferably 0.80% or less, and more preferably 0.60% or less.

Acid-Soluble Al: 0.010 to 0.065%

Acid-soluble Al is an element that is combined with N to produce (Al, Si) N that functions as an inhibitor. If the acid-soluble Al is less than 0.010%, the addition effect is not sufficiently exhibited, and the secondary recrystallization does not proceed sufficiently, and thus the acid-soluble Al is set to 0.010% or more. The acid-soluble Al is preferably 0.015% or more, and more preferably 0.020% or more.

On the other hand, if the acid-soluble Al exceeds 0.065%, the precipitation and dispersion of (Al, Si) N become non-uniform, the required secondary recrystallization structure cannot be obtained, and the magnetic flux density decreases, and thus the acid-soluble Al is set to 0.065% or less. The acid-soluble Al is preferably 0.050% or less, and more preferably 0.040% or less.

N: 0.0040% or Less

N is an element that is combined with Al to form AlN that functions as an inhibitor, but if it is 0.0040% or more in a final product, it is precipitated as AlN in the steel sheet and deteriorates the hysteresis loss, and thus it is set to 0.0040% or less. A lower limit thereof includes 0%, but if N is reduced to less than 0.0001%, the manufacturing costs will increase significantly, and thus 0.0001% is a substantial lower limit for a practical steel sheet. Also, in the grain-oriented electrical steel sheet, N is usually reduced to about 0.0001% or less by final annealing.

S: 0.0100% or Less

S is combined with Mn and functions as an inhibitor, but if S is more than 0.0100% in a final product, it is precipitated as MnS in the steel sheet and increases the hysteresis loss, and thus it is set to 0.0100% or less. A lower limit thereof includes 0%, but if S is reduced to less than 0.0001%, the manufacturing costs will increase significantly, and thus 0.0001% is a substantial lower limit for a practical steel sheet. Also, in the grain-oriented electrical steel sheet, S is usually reduced to about 0.005% or less by final annealing.

B: 0.0005 to 0.0080%

B is an element that is combined with N and is complex-precipitated with MnS to form BN that functions as an inhibitor.

If it is less than 0.0005%, the addition effect is not sufficiently exhibited, and thus B is set to 0.0005% or more. B is preferably 0.0010% or more, and more preferably 0.0015% or more. On the other hand, if it exceeds 0.0080%, the precipitation and dispersion of BN become non-uniform, the required secondary recrystallization structure cannot be obtained, and the magnetic flux density decreases, and thus B is set to 0.0080% or less. It is preferably 0.0060% or less, and more preferably 0.0040% or less.

In the components of the base steel sheet, the remainder excluding the above elements is Fe and impurities. The impurities include elements that are inevitably mixed from a steel raw material and/or in a steelmaking process and are permissible elements as long as they do not impair the characteristics of the electrical steel sheet of the present invention.

Further, instead of some of Fe, the base steel sheet may contain at least one selected from the group consisting of Cr: 0.30% or less, Cu: 0.40% or less, P: 0.50% or less, Ni: 1.00% or less, Sn: 0.30% or less, Sb: 0.30% or less, and Bi: 0.01% or less, within a range in which it does not impair the magnetic characteristics and can enhance other characteristics.

The chemical composition of the base steel sheet described above may be measured using a general analysis method for steel. For example, the chemical composition may be measured using inductively coupled plasma-atomic emission spectrometry (ICP-AES). Also, the acid-soluble Al may be measured by ICP-AES using a filtrate obtained by heat-decomposing a sample with an acid. Further, C and S may be measured using a combustion-infrared absorption method, and N may be measured using an inert gas melting-thermal conductivity method.

<Intermediate Layer>

The electrical steel sheet of the present invention includes the intermediate layer mainly composed of silicon oxide which formed in contact with the base steel sheet. In the electrical steel sheet of the present invention, the intermediate layer has a function of bringing the base steel sheet and the insulation coating into adhesion with each other.

The silicon oxide that forms the main component of the intermediate layer is preferably $SiO_\alpha$ ($\alpha$=1.0 to 2.0). When $\alpha$=1.5 to 2.0, silicon oxide is more stable, which is more preferable. If sufficient oxidation annealing is performed to form silicon oxide on the surface of the steel sheet, $SiO_2$ having $\alpha \approx 2.0$ can be formed.

A thickness of the intermediate layer (a length in a sheet thickness direction) is not particularly limited, and can be, for example, 1 nm or more and 1 μm or less. The thickness of the intermediate layer is preferably 10 nm or more and 500 nm or less.

The surface layer of the intermediate layer (in the vicinity of an interface between the intermediate layer and the insulation coating) indicates a range from an outermost surface of the intermediate layer to A×¼ nm when the thickness of the intermediate layer is A nm.

<Insulation Coating>

The electrical steel sheet of the present invention is formed in contact with the intermediate layer and includes the insulation coating mainly including phosphate and colloidal silica. The electrical steel sheet of the present invention includes the insulation coating, so that high surface tension can be applied to the electrical steel sheet of the present invention.

<Presence Form of BN>

The average particle size of BN present in the surface layer of the intermediate layer (may be hereinafter simply referred to as an intermediate layer surface layer): 50 nm or more and 300 nm or less.

If BN having an average particle size (a length of the major axis) of 50 nm or more and 300 nm or less is present in the intermediate layer surface layer (in the vicinity of the interface between the intermediate layer and the insulation coating), the insulation coating adhesion (adhesion between the base steel sheet and the insulation coating) is improved. The reason for this is not clear, but it is believed that BN having the above average particle size is present in the oxide layer (intermediate layer) present after final annealing or the oxide layer (intermediate layer) formed through an intermediate layer formation heat treatment, whereby it functions as an anchor for the oxide layer and improves the insulation coating adhesion.

Since BN is a reprecipitate after solid solution, it often has a spherical shape in order to reduce surface energy. Therefore, the shape of BN is preferably spherical. Also, in the present embodiment, the "spherical BN" represents a BN having (a major axis)/(minor axis) ratio 1.5 or less.

The average particle size of BN is 50 nm or more and 300 nm or less. If the average particle size of BN is less than 50 nm when the average particle size is defined by the major axis of the BN precipitates, the precipitation frequency of BN increases and the iron loss increases, and thus the average particle size of BN is 50 nm or more. The average particle size of BN is preferably 80 nm or more.

If the average particle size of BN exceeds 300 nm, the precipitation frequency of BN decreases and the effect of improving the insulation coating adhesion cannot be sufficiently obtained, and thus the average particle size of BN is 300 nm or less. The average particle size of BN is preferably 280 nm or less.

The average particle size is obtained by visually observing 10 visual fields of 4 μm in a sheet width direction×2 μm in the sheet thickness direction using an energy dispersive X-ray spectroscope (EDS) attached to a scanning electron microscope (SEM) or a transmission electron microscope (TEM), measuring lengths of major axes of precipitates in observed visual fields identified as BN using EDS, and setting an average value thereof to the average particle size.

Number Density of BN: $2 \times 10^6$ Pieces/$Mm^2$ or More

The number density of BN having an average particle size of 50 nm or more and 300 nm or less is preferably $2 \times 10^6$ pieces/mm² or more. If the number density of BN is less than $2 \times 10^6$ pieces/mm², the dispersion of BN functioning as an anchor becomes insufficient, and the effect of improving the insulation coating adhesion cannot be sufficiently obtained. For that reason, the number density of BN is preferably $2 \times 10^6$ pieces/mm² or more. The number density of BN is more preferably $3 \times 10^6$ pieces/mm² or more. Since the number density of BN varies depending on an amount of B in the steel sheet, no particular upper limit is set.

The number density of BN is measured by washing the grain-oriented electrical steel sheet (product) with sodium hydroxide, removing the insulation coating on the surface of the steel sheet, and observing the surface of the steel sheet (that is, the intermediate layer surface layer) using a field emission scanning electron microscope (FE-SEM). The number density of the intermediate layer surface layer can be measured in a cross-section thereof perpendicular to a rolling direction of the steel sheet by visually imaging 10 visual fields of 4 μm in the sheet width direction×2 μm in the sheet thickness direction using the EDS attached to the FE-SEM, and counting the number of BNs identified by the EDS.

In a distribution of B in a thickness direction of the steel sheet, in a case in which a concentration (strength) of B in a surface layer of the steel sheet including the oxide layer (intermediate layer) present in contact with and on the base steel sheet of the steel sheet after final annealing or the oxide layer (intermediate layer) formed by thermal oxidation is lower than a concentration (strength) of B of a base iron (base steel sheet) inside the steel sheet, BN is not precipitated on the surface layer of the steel sheet, or even if it is precipitated, the amount is small, and the insulation coating adhesion becomes inferior. Also, the surface layer of the steel sheet indicates a part ranging from the outermost surface of the intermediate layer to a position from an interface between a surface of the base iron and the intermediate layer to a position of 1/100 of a thickness of the base iron. Therefore, the surface layer of the steel sheet includes the intermediate layer and a part of the base steel sheet.

$I_{B\_t(d/100)} > I_{B\_t(d/10)}$

In the grain-oriented electrical steel sheet according to the present embodiment, when the sheet thickness excluding the insulation coating is defined as d, the measurement is performed using glow discharge emission spectrometry (GDS), the time until the sputtering depth reaches the position of d/100 from the outermost surface layer of the steel sheet (the outermost surface of the intermediate layer) excluding the insulation coating is defined as t(d/100), and the time until the sputtering depth reaches the position of d/10 from the outermost surface of the intermediate layer is defined as t(d/10), the emission intensity $I_B$ of B satisfies the following Equation (1). The position of d/100 from the outermost surface of the intermediate layer is located on the surface layer of the steel sheet, and the position of d/10 from the outermost surface of the intermediate layer is located on a base steel sheet side with respect to the surface layer of the steel sheet. Therefore, if the emission intensity $I_B$ of B satisfies the following Equation (1), a sufficient amount of BN is precipitated on the surface layer of the steel sheet, and thus the iron loss does not deteriorate and the insulation coating adhesion is further improved.

$$I_{B\_t(d/100)} > I_{B\_t(d/10)} \qquad \text{Equation (1)}$$

$I_{B\_t(d/100)}$: Emission intensity of B at t(d/100)
$I_{B\_t(d/10)}$: Emission intensity of B at t(d/10)

Also, as described above, in order to accurately control the particle size, the precipitation frequency, and the presence position of BN, it is necessary to appropriately control a temperature lowering rate after final annealing.

<Identification of Layers Constituting Grain-Oriented Electrical Steel Sheet>

In order to identify each layer in a cross-sectional structure of the present electrical steel sheet, line analysis is performed in the sheet thickness direction using EDS attached to SEM or TEM, and quantitative analysis of the chemical composition of each layer is performed. The elements to be quantitatively analyzed are 6 elements of Fe, P, Si, O, Mg and Al.

A layered region present at the deepest position in the sheet thickness direction and a region in which Fe content is 80 atomic % or more and O content is less than 30 atomic % excluding measurement noise is determined to be the base steel sheet.

Regarding regions excluding the base steel sheet identified above, a region in which Fe content is less than 80 atomic %, P content is 5 atomic % or more, and O content is 30 atomic % or more excluding measurement noise is determined to be the insulation coating.

A region excluding the silicon steel sheet and the insulation coating identified above is determined to be the intermediate layer. The intermediate layer preferably satisfies that, on average as a whole, Fe content is less than 80 atomic % on average, P content is less than 5 atomic % on average, Si content is 20 atomic % or more on average, and O content is 30 atomic % or more on average. Further, in the present embodiment, since the intermediate layer is not a forsterite coating but an oxide layer mainly including silicon oxide, Mg content of the intermediate layer is preferably less than 20 atomic % on average.

A manufacturing method for manufacturing the electrical steel sheet of the present invention will be described.

<Silicon Steel Slab Component>

A silicon steel slab that is a material of the electrical steel sheet of the present invention contains, as a chemical composition, by mass %: C: 0.085% or less, Si: 0.80 to 7.00%, Mn: 0.05 to 1.00%, acid-soluble Al: 0.010 to 0.065%, N: 0.0040 to 0.0120%, S: 0.0100% or less, and B: 0.0005 to 0.0080%.

C: 0.085% or Less

C is an element that is effective in controlling the primary recrystallization structure, but it adversely affects the magnetic characteristics, and thus it is an element that is removed by decarburization annealing before final annealing. If it exceeds 0.085%, a time of decarburization annealing becomes longer and the productivity decreases, and thus C is set to 0.085% or less. C is preferably 0.070% or less, and more preferably 0.050% or less.

A lower limit thereof includes 0%, but if C is reduced to less than 0.0001%, the manufacturing costs will increase significantly, and thus 0.0001% is an actual lower limit for a practical steel sheet. Also, in the grain-oriented electrical steel sheet, C is usually reduced to about 0.001% or less by decarburization annealing.

Si: 0.80 to 7.00%

Si is an element that increases electrical resistance of the steel sheet and improves iron loss characteristics. If it is less than 0.80%, γ transformation occurs during final annealing and the crystal orientation of the steel sheet is impaired, and thus Si is set to 0.80% or more. Si is preferably 1.50% or more, and more preferably 2.50% or more.

On the other hand, if it exceeds 7.00%, workability deteriorates and cracks occur during rolling, and thus Si is set to 7.00% or less. Si is preferably 5.50% or less, and more preferably 4.50% or less.

Mn: 0.05 to 1.00%

Mn is an element that prevents cracks during hot rolling and is combined with S and/or Se to form MnS that functions as an inhibitor. If it is less than 0.05%, the addition effect is not sufficiently exhibited, and thus Mn is set to 0.05% or more. Mn is preferably 0.07% or more, and more preferably 0.09% or more.

On the other hand, if it exceeds 1.00%, the precipitation and dispersion of MnS become non-uniform, the required secondary recrystallization structure cannot be obtained, and the magnetic flux density decreases, and thus Mn is set to 1.00% or less. Mn is preferably 0.80% or less, and more preferably 0.60% or less.

Acid-Soluble Al: 0.010 to 0.065%

Acid-soluble Al is an element that is combined with N to produce (Al, Si) N that functions as an inhibitor. If it is less than 0.010%, the addition effect is not sufficiently exhibited and the secondary recrystallization does not proceed sufficiently, and thus the acid-soluble Al is set to 0.010% or more. The acid-soluble Al is preferably 0.015% or more, and more preferably 0.020% or more.

On the other hand, if it exceeds 0.065%, the precipitation and dispersion of (Al, Si) N become non-uniform, the required secondary recrystallization structure cannot be obtained, and the magnetic flux density decreases, and thus the acid-soluble Al is 0.065% or less. The acid-soluble Al is preferably 0.050% or less, and more preferably 0.040% or less.

N: 0.0040 to 0.0120%

N is an element that is combined with Al to form AlN that functions as an inhibitor, but on the other hand, it is also an element that forms blisters (voids) in the steel sheet during cold rolling. If it is less than 0.004%, the formation of AlN is insufficient, and thus N is set to 0.004% or more. N is preferably 0.006% or more, and more preferably 0.007% or more.

On the other hand, if it exceeds 0.012%, there is a concern that blisters (voids) may be formed in the steel sheet during cold rolling, and thus N is set to 0.012% or less. N is preferably 0.010% or less, and more preferably 0.009% or less.

S: 0.0100% or Less

S is an element that is combined with Mn to form MnS that functions as an inhibitor.

If S is 0.0100% or more, the precipitation dispersion of MnS becomes non-uniform after purification, and the desired secondary recrystallization structure cannot be obtained, and thus the magnetic flux density decreases, the hysteresis loss increases, MnS remains after purification, and the hysteresis loss increases.

There is no particular lower limit, but it is preferably 0.0030% or more. More preferably, it is 0.0070% or more.

B: 0.0005 to 0.0080%

B is an element that is combined with N and is complex-precipitated with MnS to form BN that functions as an inhibitor.

If it is less than 0.0005%, the addition effect is not sufficiently exhibited, and thus B is set to 0.0005% or more. B is preferably 0.0010% or more, and more preferably 0.0015% or more. On the other hand, if it exceeds 0.0080%, the precipitation and dispersion of BN become non-uniform, the required secondary recrystallization structure cannot be obtained, and the magnetic flux density decreases, and thus B is set to 0.0080% or less. B is preferably 0.0060% or less, and more preferably 0.0040% or less.

In the silicon steel slab, the remainder excluding the above elements is Fe and impurities. The impurities include elements that are inevitably mixed from the steel raw material and/or in the steelmaking process and are permissible elements within the range in which they do not impair the characteristics of the electrical steel sheet of the present invention.

Further, instead of some of Fe, the silicon steel slab may contain at least one selected from the group consisting of Cr: 0.30% or less, Cu: 0.40% or less, P: 0.50% or less, Ni: 1.00% or less, Sn: 0.30% or less, Sb: 0.30% or less, and Bi: 0.01% or less within the range in which the magnetic characteristics of the electrical steel sheet of the present invention are not impaired and other characteristics can be enhanced.

<Manufacturing of Silicon Steel Slab>

The silicon steel slab is obtained by continuously casting or ingot casting and slabbing molten steel having a required composition that has been melted in a converter or an electric furnace and, if necessary, vacuum degassed. The silicon steel slab is usually a slab having a thickness of 150 to 350 mm, preferably 220 to 280 mm, but may be a thin slab of 30 to 70 mm. In the case of a thin slab, there is an advantage that roughening into an intermediate thickness is not required at the time of manufacturing a hot-band.

<Heating Temperature of Silicon Steel Slab>

The silicon steel slab is preferably heated to 1250° C. or lower and subjected to hot rolling. If the heating temperature exceeds 1250° C., an amount of molten scale increases, and MnS and/or MnSe is completely solid-solved and finely precipitated in the subsequent processes, and thus it is necessary to set the decarburization annealing temperature to 900° C. or higher to obtain a desired primary recrystallization particle size. For that reason, the heating temperature is preferably 1250° C. or lower. The heating temperature is more preferably 1200° C. or lower.

A lower limit of the heating temperature is not particularly limited, but the heating temperature is preferably 1100° C. or higher from the viewpoint of ensuring the workability of the silicon steel slab.

<Hot Rolling and Hot-Band Annealing>

The silicon steel slab heated to 1250° C. or lower is subjected to hot rolling to form a hot-band. In the hot-band annealing, the hot-band is heated to 1000 to 1150° C. (a first stage temperature) to recrystallize, and then heated to 850 to 1100° C. (a second stage temperature), which is lower than the first stage temperature, and annealed to homogenize a non-uniform structure generated during hot rolling. The hot-band annealing is preferably performed once or more in order to homogenize the history of the hot-band in the hot rolling before it is subjected to final cold rolling.

In the hot-band annealing, the first stage temperature greatly affects the precipitation of the inhibitor in the subsequent processes. If the first stage temperature exceeds 1150° C., the inhibitor is finely precipitated in the subsequent processes, and the decarburization annealing temperature for obtaining the desired primary recrystallization particle size needs to be 900° C. or higher. For that reason, the first stage temperature is preferably 1150° C. or lower. The first stage temperature is more preferably 1120° C. or lower.

On the other hand, if the first stage temperature is lower than 1000° C., recrystallization is insufficient and homogenization of the hot-band structure is not achieved, and thus the first stage temperature is preferably 1000° C. or higher. The first stage temperature is more preferably 1030° C. or higher.

If the second stage temperature exceeds 1100° C., the inhibitor is finely precipitated in the subsequent processes as in the case of the first stage temperature, and thus the second stage temperature is preferably 1100° C. or lower. The second stage temperature is more preferably 1070° C. or lower. On the other hand, if the second stage temperature is lower than 850° C., the y phase is not generated and homogenization of the hot-band structure is not achieved, and thus the second stage temperature is preferably 850° C. or higher. The second stage temperature is more preferably 880° C. or higher.

<Cold Rolling>

The steel sheet that has been subjected to hot-band annealing is subjected to cold rolling once or to cold rolling twice or more with intermediate annealing interposed between to obtain the steel sheet having a final thickness. The cold rolling may be performed at room temperature (10 to 30° C.), or the steel sheet may be heated to a temperature higher than the room temperature, for example, about 200° C. for warm rolling.

<Decarburization Annealing>

For the purpose of removing C in the steel sheet and controlling a primary recrystallization grain size to a desired grain size on the steel sheet having the final thickness, the decarburization annealing is performed in a moist atmosphere with an oxidation degree of less than 0.15. For example, it is preferable to perform the decarburization annealing at a temperature of 770 to 950° C. for a time during which the primary recrystallization particle size is 15 µm or more. Here, the oxidation degree is obtained by dividing a partial pressure ($P_{H2O}$) of $H_2O$ gas in the atmospheric gas by a partial pressure ($P_{H2}$) of $H_2$ gas, that is, $P_{H2O}/P_{H2}$.

If the decarburization annealing temperature is less than 770° C., the desired crystal grain size cannot be obtained, and thus the decarburization annealing temperature is preferably 770° C. or higher. The decarburization annealing temperature is more preferably 800° C. or higher. On the other hand, if the decarburization annealing temperature exceeds 950° C., the crystal grain size exceeds the desired crystal grain size, and thus the decarburization annealing temperature is preferably 950° C. or lower. The decarburization annealing temperature is more preferably 920° C. or lower.

<Nitriding Treatment>

Before final annealing, the decarburization-annealed steel sheet is subjected to nitriding treatment so that N content of the steel sheet is 40 to 1000 ppm. The nitriding treatment method is not particularly limited, and for example, a steel sheet that has been decarburization-annealed can be nitriding-treated with ammonia gas. If the N content of the steel sheet after the nitriding treatment is less than 40 ppm, AlN does not sufficiently precipitate and AlN does not function as an inhibitor, and thus the N content of the steel sheet after the nitriding treatment is preferably 40 ppm or more. The N content of the steel sheet after the nitriding treatment is more preferably 80 ppm or more.

On the other hand, if the N content of the steel sheet exceeds 1000 ppm, AlN is excessively present even after the completion of the secondary recrystallization in the next final annealing, and the iron loss increases, and thus the N content is preferably 1000 ppm or less. The N content of the steel sheet after the nitriding treatment is more preferably 970 ppm or less.

<Application of Annealing Separator>

Subsequently, an annealing separator containing magnesia as a main component is applied to the nitriding-treated steel sheet and subjected to final annealing. A glass film made of forsterite is formed on the surface of the steel sheet by final annealing, and the coating is removed by means such as pickling and grinding. After removing the glass film, the surface of the steel sheet is preferably smoothed by chemical polishing or electric field polishing.

Alternatively, an annealing separator containing alumina as the main component can be used instead of magnesia as the annealing separator, and the nitriding-treated steel sheet is applied with this, dried, coiled into a coil after drying, and subjected to final annealing (secondary recrystallization and/or purification annealing). Due to the final annealing, the formation of a coating made of an inorganic mineral substance such as forsterite can be inhibited to produce the grain-oriented electrical steel sheet. After production, the surface of the steel sheet is preferably smoothed by chemical polishing or electric field polishing.

<Final Annealing>

[Secondary Recrystallization Annealing]

In the secondary recrystallization annealing of the final annealing, the crystal grains in the {110}<001> orientation grow preferentially due to the inhibitor function of BN. The secondary recrystallization annealing is a process of annealing a steel sheet coated with an annealing separator at a heating rate of 15° C./hour or less in a temperature range of 1000 to 1100° C. in the heating process up to a purification annealing temperature. The heating rate in the temperature range of 1000 to 1100° C. is more preferably 10° C./hour or less. In the secondary recrystallization annealing, instead of controlling the heating rate, the steel sheet coated with the annealing separator may be held in a temperature range of 1000 to 1100° C. for 10 hours or more.

[Purification Annealing]

The steel sheet that has been subjected to the secondary recrystallization annealing may be subjected to purification annealing following the secondary recrystallization annealing. When the steel sheet after the completion of the secondary recrystallization is subjected to the purification annealing, the precipitates used as the inhibitor are detoxified and the hysteresis loss in the final magnetic characteristics is reduced. The purification annealing is preferably carried out by retaining at 1200° C. for 10 to 30 hours in a hydrogen atmosphere, for example.

In order to control the average particle size of BN to 50 to 300 nm, a temperature lowering rate in the temperature range of 1200 to 1000° C. is less than 50° C./hour. Further, the temperature lowering rate in the temperature range of 1000 to 600° C. is less than 30° C./hour.

The reason for setting such a temperature lowering rate is as follows.

BN becomes solid solution B and solid solution N in a high temperature range, and N that cannot be solid-solved is released into the atmosphere during lowering the temperature, but during lowering the temperature, B that cannot be solid-solved is not released into the atmosphere and is precipitated as B compounds, for example, BN, $Fe_2B$, and $Fe_3B$, on the surface layer of the steel sheet including the intermediate layer mainly composed of silicon oxide or inside the steel sheet. If the solid solution N is not sufficiently present inside the steel sheet, BN does not precipitate and $Fe_2B$ or $Fe_3B$ precipitates.

During lowering the temperature from the high temperature range, if the temperature lowering rate is appropriate, the solid solution N is released to the outside of the system, $Fe_2B$ or $Fe_3B$ is precipitated inside the steel sheet, and the precipitated $Fe_2B$ or $Fe_3B$ is Ostwald-grown and becomes coarse. The solid solution B on the surface layer of the steel sheet is combined with N in the atmosphere and precipitates as a fine BN in the oxide layer present on the surface layer or the outermost layer of the steel sheet.

If the temperature lowering rate is high, the solid solution N is not released to the outside of the system, and BN is finely precipitated inside the steel sheet, or $Fe_2B$ or $Fe_3B$ is finely precipitated without Ostwald-growth. The BN finely precipitated inside the steel sheet increases the hysteresis loss and causes an increase in the iron loss of the final product.

A lower limit of the temperature lowering rate is not particularly limited, but if the temperature lowering rate is less than 10° C./hour, it greatly affects the productivity, and thus the temperature lowering rate is preferably 10° C./hour or more. Therefore, the temperature lowering rate in the temperature range of 1200 to 1000° C. is preferably 10 to 50° C./hour, and the temperature lowering rate in the temperature range of 1000 to 600° C. is preferably 10 to 30° C./hour.

<Intermediate Layer Formation Heat Treatment>

The grain-oriented electrical steel sheet from which a coating of an inorganic mineral substance such as forsterite (forsterite film) has been removed or the grain-oriented electrical steel sheet in which formation of a coating of an inorganic mineral substance such as forsterite is inhibited is annealed to form the intermediate layer mainly composed of silicon oxide on the surface of the base steel sheet.

The annealing atmosphere is preferably a reducing atmosphere so that the inside of the steel sheet is not oxidized, and particularly preferably a nitrogen atmosphere mixed with hydrogen. For example, an atmosphere in which hydrogen: nitrogen is 75% by volume: 25% by volume and the dew point is −20 to 0° C. is preferable.

The intermediate layer formation heat treatment process may be omitted for the grain-oriented electrical steel sheet from which the coating of the inorganic mineral substance such as forsterite has been removed or the grain-oriented electrical steel sheet in which formation of the coating of the inorganic mineral substance such as forsterite is inhibited.

<Formation of Insulation Coating>

After applying an aqueous coating solution (insulation coating forming solution) mainly composed of phosphate and colloidal silica to the intermediate layer mainly composed of silicon oxide on the steel sheet having the intermediate layer, the insulation coating formation solution is baked to form the insulation coating.

As the phosphate, for example, a phosphate of Ca, Al, Sr, or the like is preferable, and among them, an aluminum phosphate is more preferable. A type of colloidal silica is not particularly limited, and its particle size (average particle size) can be appropriately selected, but if it exceeds 200 nm, it may settle in a treatment agent, and thus the particle size (average particle size based on the number) of the colloidal silica is preferably 200 nm or less. The particle size of colloidal silica is more preferably 170 nm.

Even if the particle size of the colloidal silica is less than 100 nm, there is no problem in dispersion, but the manufacturing costs increase, and thus 100 nm or more is preferable from the economical point of view. The particle size of the colloidal silica is more preferably 150 nm or more.

The coating method of the insulation coating formation solution is not particularly limited, and for example, a wet coating method using a roll coater or the like can be used.

The baking atmosphere can be formed by, for example, baking in air at 800 to 900° C. for 10 to 60 seconds, but the baking atmosphere is not particularly limited.

<Magnetic Domain Control>

Magnetic domain control is performed to the grain-oriented electrical steel sheet on which the insulation coating is formed in order to reduce the iron loss. The magnetic domain control method is not limited to a specific method, but the magnetic domain control can be performed using, for example, laser irradiation, electron beam irradiation, etching, or a groove forming method using gears. As a result, a grain-oriented electrical steel sheet having a lower iron loss can be obtained. The magnetic domain control processing may be performed for the steel sheet after cold rolling.

EXAMPLES

Example 1

Steel slabs A1 to A15 having the composition shown in Table 1-1 were heated to 1150° C. and subjected to hot rolling to obtain hot-rolled steel sheets having a sheet thickness of 2.6 mm, the hot-rolled steel sheets were subjected to hot-rolled sheet annealing in which annealing is performed at 1100° C. and subsequently at 900° C., and then cold-rolled once or cold-rolled a plurality of times with intermediate annealing interposed therebetween at 30° C. to obtain cold-rolled steel sheets having a final sheet thickness of 0.22 mm.

Steel slabs a1 to a13 having the composition shown in Table 1-1 were heated to 1150° C. and subjected to hot rolling to obtain hot-rolled steel sheets having a sheet thickness of 2.6 mm, the hot-rolled steel sheets were subjected to hot-rolled sheet annealing in which annealing is performed at 1100° C. and subsequently at 900° C., and then cold-rolled once or cold-rolled a plurality of times with intermediate annealing interposed therebetween at 30° C. to obtain cold-rolled steel sheets having a final sheet thickness of 0.22 mm.

TABLE 1-1

| Slab No. | Steel slab chemical components (mass %) (remainder is Fe and impurities) | | | | | | |
|---|---|---|---|---|---|---|---|
| | C | Si | Mn | Al | N | S | B |
| A1 | 0.085 | 3.45 | 0.10 | 0.028 | 0.0040 | 0.008 | 0.0015 |
| A2 | 0.031 | 1.21 | 0.10 | 0.029 | 0.0100 | 0.009 | 0.0020 |
| A3 | 0.033 | 6.52 | 0.10 | 0.029 | 0.0100 | 0.007 | 0.0018 |
| A4 | 0.041 | 3.45 | 0.08 | 0.028 | 0.0070 | 0.005 | 0.0019 |
| A5 | 0.044 | 3.33 | 0.80 | 0.029 | 0.0060 | 0.004 | 0.0021 |
| A6 | 0.052 | 4.52 | 0.12 | 0.020 | 0.0050 | 0.003 | 0.0016 |
| A7 | 0.055 | 3.12 | 0.09 | 0.055 | 0.0017 | 0.001 | 0.0017 |
| A8 | 0.061 | 2.81 | 0.09 | 0.030 | 0.0120 | 0.009 | 0.0018 |
| A9 | 0.062 | 3.12 | 0.11 | 0.030 | 0.0040 | 0.001 | 0.0019 |
| A10 | 0.071 | 2.92 | 0.13 | 0.030 | 0.0050 | 0.001 | 0.0021 |
| A11 | 0.078 | 3.45 | 0.12 | 0.028 | 0.0110 | 0.010 | 0.0022 |
| A12 | 0.055 | 3.44 | 0.10 | 0.027 | 0.0090 | 0.007 | 0.0006 |
| A13 | 0.085 | 4.21 | 0.10 | 0.027 | 0.0080 | 0.006 | 0.0078 |
| A14 | 0.082 | 3.45 | 0.11 | 0.031 | 0.0100 | 0.008 | 0.0025 |
| A15 | 0.045 | 3.35 | 0.12 | 0.030 | 0.0060 | 0.009 | 0.0017 |
| a1 | 0.092 | 3.45 | 0.12 | 0.029 | 0.0019 | 0.007 | 0.0002 |
| a2 | 0.076 | 0.50 | 0.08 | 0.028 | 0.0028 | 0.007 | 0.0004 |
| a3 | 0.065 | 8.00 | 0.09 | 0.028 | 0.0031 | 0.007 | 0.0004 |
| a4 | 0.045 | 3.45 | 0.04 | 0.029 | 0.0021 | 0.009 | 0.0002 |

TABLE 1-1-continued

| Slab No. | Steel slab chemical components (mass %) (remainder is Fe and impurities) | | | | | | |
|---|---|---|---|---|---|---|---|
| | C | Si | Mn | Al | N | S | B |
| a5 | 0.061 | 3.35 | 1.21 | 0.029 | 0.0035 | 0.009 | 0.0006 |
| a6 | 0.032 | 3.25 | 0.08 | 0.005 | 0.0038 | 0.006 | 0.0007 |
| a7 | 0.012 | 3.12 | 0.07 | 0.082 | 0.0032 | 0.006 | 0.0009 |
| a8 | 0.072 | 3.23 | 0.08 | 0.030 | 0.0051 | 0.009 | 0.0061 |
| a9 | 0.043 | 3.45 | 0.10 | 0.027 | 0.0152 | 0.009 | 0.0003 |
| a10 | 0.033 | 3.55 | 0.09 | 0.026 | 0.0012 | 0.012 | 0.0055 |
| a11 | 0.039 | 3.15 | 0.08 | 0.026 | 0.0022 | 0.030 | 0.0002 |
| a12 | 0.058 | 3.28 | 0.10 | 0.027 | 0.0019 | 0.007 | 0.0003 |
| a13 | 0.021 | 3.19 | 0.13 | 0.028 | 0.0036 | 0.007 | 0.0152 |

The grain-oriented electrical steel sheets of Nos. B1 to B15 shown in Table 2 were manufactured as follows. Cold-rolled steel sheets having a final sheet thickness of 0.22 mm were subjected to decarburization annealing in which uniform heat treatment is performed at 860° C. in a moist atmosphere with the oxidation degree of 0.10, and then nitriding treatment (annealing that increases an amount of nitrogen in the steel sheets) is performed with ammonia gas. Subsequently, an annealing separator containing alumina as a main component was applied to the nitriding-treated steel sheets, and final annealing was performed at a temperature of 1200° C. for 20 hours in a hydrogen gas atmosphere. When the temperature was raised in the final annealing, the heating rate in the range of 1000 to 1100° C. was set to 5° C./hour. Further, after holding at 1200° C. for 20 hours, the temperature lowering rate in the range of 1200 to 1000° C. was set to 45° C./hour, and the temperature lowering rate in the range of 1000 to 600° C. was set to 25° C./hour. After the final annealing, excess alumina was removed from the steel sheets, and intermediate layer formation heat treatment was performed on the steel sheets from which excess alumina had been removed in an atmosphere of hydrogen: nitrogen of 75% by volume: 25% by volume and a dew point of −5° C. An aqueous coating solution mainly including colloidal silica and phosphate is applied onto the steel sheets after the intermediate layer formation heat treatment, and insulation coatings were formed by baking at a temperature of −5° C. for 30 seconds in an atmosphere of 75% by volume of hydrogen: 25% by volume of nitrogen to obtain products. The average particle size based on the number of the colloidal silica in the aqueous coating solution used was 100 nm.

Table 1-2 shows chemical compositions contained in the base steel sheets in the products. The compositions of the base steel sheets were measured using ICP-AES. Acid-soluble Al was measured by ICP-AES using a filtrate obtained by heat-decomposing samples with an acid. Further, C and S were measured using a combustion-infrared absorption method, and N was measured using an inert gas melting-thermal conductivity method.

The grain-oriented electrical steel sheets of Nos. b1 to b13 shown in Table 1-2 were manufactured as follows. Cold-rolled steel sheets having a final sheet thickness of 0.22 mm were subjected to decarburization annealing in which uniform heat treatment is performed at 860° C. in a moist atmosphere with the oxidation degree of 0.10, and then nitriding treatment (annealing to increase an amount of nitrogen in the steel sheets) was performed with ammonia gas. Subsequently, an annealing separator containing alumina as a main component was applied to the steel sheets after nitriding treatment, and final annealing was performed at a temperature of 1200° C. for 20 hours in a hydrogen gas atmosphere. When the temperature was raised in the final annealing, the heating rate in the range of 1000 to 1100° C. was set to 5° C./hour. Further, after holding at 1200° C. for 20 hours, the temperature lowering rate in the range of 1200 to 1000° C. was set to 100° C./hour, and the temperature lowering rate in the range of 1000 to 600° C. was 100° C./hour. After the final annealing, excess alumina was removed from the steel sheets, and intermediate layer formation heat treatment was performed on the steel sheets from which the excess alumina have been removed in an atmosphere of hydrogen: nitrogen of 75% by volume: 25% by volume and a dew point of −5° C. An aqueous coating solution mainly including colloidal silica and phosphate is applied onto the steel sheets after the intermediate layer formation heat treatment, and insulation coatings were formed by baking at a temperature of −5° C. for 30 seconds in an atmosphere of 75% by volume of hydrogen: 25% by volume of nitrogen to obtain products. The average particle size based on the number of the colloidal silica in the aqueous coating solution used was 100 nm.

Table 1-2 shows chemical compositions contained in the base steel sheets in the products. The compositions of the base steel sheets were measured using the same method as for steel Nos. B1 to B15.

The grain-oriented electrical steel sheet of steel No. b14 shown in Table 1-2 was manufactured as follows. A cold-rolled steel sheet having a final sheet thickness of 0.22 mm was subjected to decarburization annealing in which uniform heat treatment is performed at 850° C. in a moist atmosphere with an oxidation degree of 0.10, and then nitriding treatment (annealing to increase an amount of nitrogen in the steel sheet) was performed with ammonia gas. Subsequently, an annealing separator containing alumina as a main component was applied to the steel sheet after nitriding treatment, and final annealing was performed at a temperature of 1200° C. for 20 hours in a hydrogen gas atmosphere. When the temperature was raised in the final annealing, the heating rate in the range of 1000 to 1100° C. was set to 5° C./hour. Further, after holding at 1200° C. for 20 hours, the temperature lowering rate in the range of 1200 to 1000° C. was set to 200° C./hour, and the temperature lowering rate in the range of 1000 to 600° C. was set to 100° C./hour. After the final annealing, excess alumina was removed from the steel sheet, and the intermediate layer formation heat treatment was performed on the steel sheet from which the excess alumina has been removed in an atmosphere in which hydrogen: nitrogen was 75% by volume: 25% by volume and a dew point was −5° C. An aqueous coating solution mainly composed of colloidal silica and phosphate was applied onto the steel sheet after the intermediate layer formation heat treatment, and an insulation coating was formed by baking at a temperature of 800° C. for 30 seconds in an atmosphere of 75% by volume of hydrogen: 25% by volume of nitrogen to obtain a product. The average particle size based on the number of the colloidal silica in the aqueous coating solution used was 100 nm.

The grain-oriented electrical steel sheet of steel No. b15 shown in Table 1-2 was manufactured as follows. A cold-rolled steel sheet having a final sheet thickness of 0.22 mm was subjected to decarburization annealing in which uniform heat treatment is performed at 860° C. in a moist atmosphere with an oxidation degree of 0.10, and then nitriding treatment (annealing to increase an amount of nitrogen in the steel sheet) was performed with ammonia gas. Subsequently, an annealing separator containing alumina as a main component was applied to the steel sheet after nitriding treatment, and final annealing was performed at a temperature of 1200° C. for 20 hours in a hydrogen gas atmosphere. When the temperature was raised in the final annealing, the heating rate in the range of 1000 to 1100° C. was set to 5° C./hour. Further, after holding at 1200° C. for 20 hours, the temperature lowering rate in the range of 1200 to 1000° C. was set to 30° C./hour, and the temperature was kept at 1000° C. for 1 hour or more, and the temperature lowering rate in the range of 1000 to 600° C. was set to 50° C./hour. After the final annealing, excess alumina was removed from the steel sheet, and intermediate layer formation heat treatment was performed on the steel sheet from which the excess alumina has been removed in an atmosphere of 75% by volume of hydrogen: 25% by volume of nitrogen and a dew point of −5° C. An aqueous coating solution mainly composed of colloidal silica and phosphate was applied onto the steel sheet after the intermediate layer formation heat treatment, and an insulation coating was formed by baking at a temperature of 800° C. for 30 seconds in an atmosphere of 75% by volume of hydrogen: 25% by volume of nitrogen to obtain a product. The average particle size based on the number of the colloidal silica in the aqueous coating solution used was 100 nm.

the composition of BN. In addition, in the item of "presence or absence of BN precipitation" in Table 2, ○ represents that one or more spherical BNs (BNs having a ratio of the major axis to the minor axis of 1.5 or less) were present in an observed visual field, and x represents that there were no spherical BN in the observed visual field.

<B Emission Intensity>

The emission intensity $I_B$ of B was measured using glow discharge emission spectrometry (GDS). $I_{B\_t(d/100)}$ that is the emission intensity of B at t(d/100), and $I_{B\_t(d/10)}$ that is the emission intensity of B at t(d/10) were obtained when a sputtering time during which the sputtering depth reached the position of d/100 from the outermost surface of the steel sheet excluding the insulation coating was defined as t(d/100), and a sputtering time during which the sputtering depth reached the position of d/10 from the outermost surface of the steel sheet excluding the insulation coating was defined as t (d/10), and $I_{B\_t(d/100)}/I_{B\_t(d/10)}$ that is the ratio of them was written in the table.

<Coating Adhesion>

Coating adhesion was evaluated with a peeled area ratio at each diameter by forming the insulation coating on the steel sheet after final annealing and then winding the steel

TABLE 1-2

| | Steel No. | Slab No. | Chemical components (mass %) (remainder is Fe and impurities) | | | | | | |
|---|---|---|---|---|---|---|---|---|---|
| | | | C | Si | Mn | Al | N | S | B |
| Examples | B1 | A1 | 0.080 | 3.45 | 0.10 | 0.028 | 0.0021 | 0.0021 | 0.0015 |
| | B2 | A2 | 0.031 | 1.21 | 0.10 | 0.029 | 0.0031 | 0.0032 | 0.0020 |
| | B3 | A3 | 0.001 | 6.52 | 0.10 | 0.029 | 0.0012 | 0.0012 | 0.0018 |
| | B4 | A4 | 0.003 | 3.45 | 0.08 | 0.028 | 0.0010 | 0.0007 | 0.0019 |
| | B5 | A5 | 0.005 | 3.33 | 0.80 | 0.029 | 0.0021 | 0.0005 | 0.0021 |
| | B6 | A6 | 0.001 | 4.52 | 0.12 | 0.020 | 0.0019 | 0.0007 | 0.0016 |
| | B7 | A7 | 0.002 | 3.12 | 0.09 | 0.055 | 0.0017 | 0.0008 | 0.0017 |
| | B8 | A8 | 0.003 | 2.81 | 0.09 | 0.030 | 0.0006 | 0.0009 | 0.0018 |
| | B9 | A9 | 0.007 | 3.12 | 0.11 | 0.030 | 0.0039 | 0.0051 | 0.0019 |
| | B10 | A10 | 0.006 | 2.92 | 0.13 | 0.030 | 0.0022 | 0.0004 | 0.0021 |
| | B11 | A11 | 0.012 | 3.45 | 0.12 | 0.028 | 0.0018 | 0.0092 | 0.0022 |
| | B12 | A12 | 0.011 | 3.44 | 0.10 | 0.027 | 0.0019 | 0.0007 | 0.0006 |
| | B13 | A13 | 0.002 | 4.21 | 0.10 | 0.027 | 0.0010 | 0.0081 | 0.0078 |
| | B14 | A14 | 0.003 | 3.45 | 0.11 | 0.031 | 0.0009 | 0.0005 | 0.0025 |
| | B15 | A15 | 0.001 | 3.35 | 0.12 | 0.030 | 0.0008 | 0.0005 | 0.0017 |
| Comparative examples | b1 | a1 | 0.090 | 3.45 | 0.12 | 0.029 | 0.0008 | 0.0012 | 0.0002 |
| | b2 | a2 | 0.008 | 0.50 | 0.08 | 0.028 | 0.0010 | 0.0014 | 0.0004 |
| | b3 | a3 | 0.001 | 8.00 | 0.09 | 0.028 | 0.0009 | 0.0018 | 0.0004 |
| | b4 | a4 | 0.002 | 3.45 | 0.04 | 0.029 | 0.0011 | 0.0022 | 0.0002 |
| | b5 | a5 | 0.001 | 3.35 | 1.21 | 0.029 | 0.0019 | 0.0009 | 0.0006 |
| | b6 | a6 | 0.012 | 3.25 | 0.08 | 0.005 | 0.0018 | 0.0010 | 0.0007 |
| | b7 | a7 | 0.011 | 3.12 | 0.07 | 0.082 | 0.0018 | 0.0022 | 0.0009 |
| | b8 | a8 | 0.001 | 3.23 | 0.08 | 0.030 | 0.0018 | 0.0018 | 0.0061 |
| | b9 | a9 | 0.002 | 3.45 | 0.10 | 0.027 | 0.0018 | 0.0011 | 0.0003 |
| | b10 | a10 | 0.001 | 3.55 | 0.09 | 0.026 | 0.0009 | 0.0025 | 0.0055 |
| | b11 | a11 | 0.020 | 3.15 | 0.08 | 0.026 | 0.0018 | 0.0021 | 0.0002 |
| | b12 | a12 | 0.010 | 3.28 | 0.10 | 0.027 | 0.0007 | 0.0012 | 0.0003 |
| | b13 | a13 | 0.002 | 3.19 | 0.13 | 0.028 | 0.0018 | 0.0011 | 0.0152 |
| | b14 | a14 | 0.002 | 3.28 | 0.12 | 0.028 | 0.0019 | 0.0012 | 0.0029 |
| | b15 | a15 | 0.001 | 3.32 | 0.11 | 0.019 | 0.0009 | 0.0018 | 0.0112 |

<Magnetic Domain Control>

The magnetic domain control was performed on the product on which the insulation coating was formed using a mechanical method, a laser, or an electron beam. For some products, the cold-rolled sheets were grooved by etching or laser irradiation to control the magnetic domain.

<Precipitates>

Regarding the precipitates, the B compound observed up to 5 μm from the outermost surface of the intermediate layer perpendicular to the rolling direction of the steel sheet was analyzed using SEM-EDS to identify the particle size and sheet around round bars having different diameters (20 mm, 10 mm, and 5 mm). The peeled area ratio is a ratio obtained by dividing an actually peeled area by a processed part area (an area in which the steel sheet is in contact with a round bar, which corresponds to a test width×a diameter of the round bar×n). If the peeling does not progress and the peeled area ratio is small even when the insulation coating is peeled off via a strong bending process, it can be evaluated that deterioration of transformer characteristics is small.

The coating adhesion was evaluated on a scale of 7 levels from A to G when a peeled area ratio of 0% is defined as A, more than 0% and less than 20% is defined as B, 20% or more and less than 40% is defined as C, 40% or more and less than 60% is defined as D, 60% or more and less than 80% is defined as E, 80% or more and less than 100% is defined as F, and 100% is defined as G. The evaluation of B or higher was evaluated as having good coating adhesion.

<Magnetic Characteristics>
<Magnetic Flux Density B8>

The magnetic flux density B8 (magnetic flux density when magnetized at 800 A/m) was measured with respect to the grain-oriented electrical steel sheet obtained using the above-mentioned manufacturing method through single sheet magnetic measurement (SST).

<Iron Loss W17/50>

A test piece (for example, a 100 mm×500 mm test piece) was prepared from the grain-oriented electrical steel sheet before and after the magnetic domain control, and the iron loss W17/50 (unit: W/kg), which is an energy loss per unit weight measured under excitation conditions at a magnetic flux density of 1.7 T and a frequency of 50 Hz, was measured.

Table 2 shows a precipitation state of BN of the grain-oriented electrical steel sheet (product), the results of GDS, the evaluation of the coating adhesion, and the magnetic characteristics. In the examples C1 to C15 within the scope of the present invention, grain-oriented electrical steel sheets having excellent coating adhesion and excellent magnetic characteristics have been obtained. In comparative examples c1 to c15 outside the scope of the present invention, either the coating adhesion or the magnetic characteristics were inferior.

TABLE 2

| | No. | Steel No. | Presence or absence of BN precipitation | Average particle size of BN (nm) | $I_{B\_t(d/100)}/I_{B\_t(d/10)}$ | Coating adhesion 20 mm φ peeling area ratio | Coating adhesion 10 mm φ peeling area ratio | Coating adhesion 5 mm φ peeling area ratio | Magnetic flux density B8 (T) | Iron loss $W_{17/50}$ (W/kg) | Iron loss $W_{17/50}$ of magnetic domain control (W/kg) | Miscellaneous |
|---|---|---|---|---|---|---|---|---|---|---|---|---|
| Examples | C1 | B1 | ○ | 120 | 1.3 | A | A | B | 1.946 | 0.87 | 0.62 | |
| | C2 | B2 | ○ | 50 | 1.1 | A | B | B | 1.947 | 0.86 | 0.64 | |
| | C3 | B3 | ○ | 80 | 1.6 | A | A | B | 1.953 | 0.87 | 0.66 | |
| | C4 | B4 | ○ | 150 | 2.0 | A | A | B | 1.952 | 0.88 | 0.64 | |
| | C5 | B5 | ○ | 300 | 4.5 | A | B | B | 1.944 | 0.85 | 0.63 | |
| | C6 | B6 | ○ | 280 | 2.8 | A | A | B | 1.948 | 0.89 | 0.62 | |
| | C7 | B7 | ○ | 200 | 1.9 | A | B | B | 1.956 | 0.87 | 0.63 | |
| | C8 | B8 | ○ | 150 | 2.3 | A | A | B | 1.951 | 0.86 | 0.60 | |
| | C9 | B9 | ○ | 130 | 1.9 | A | B | B | 1.951 | 0.87 | 0.61 | |
| | C10 | B10 | ○ | 70 | 2.2 | A | B | B | 1.947 | 0.87 | 0.62 | |
| | C11 | B1 | ○ | 90 | 2.3 | A | A | B | 1.945 | 0.85 | 0.64 | |
| | C12 | B12 | ○ | 110 | 4.3 | A | A | B | 1.949 | 0.89 | 0.65 | |
| | C13 | B13 | ○ | 250 | 5.5 | A | B | B | 1.956 | 0.86 | 0.64 | |
| | C14 | B14 | ○ | 200 | 3.5 | A | A | B | 1.944 | 0.84 | 0.64 | |
| | C15 | B15 | ○ | 100 | 1.5 | A | A | B | 1.954 | 0.85 | 0.60 | |
| Comparative Examples | c1 | b1 | × | — | 0.8 | E | E | G | 1.945 | 0.95 | 0.69 | No BN precipitation |
| | c2 | b2 | × | — | 0.7 | G | G | G | 1.944 | 0.97 | 0.71 | No BN precipitation |
| | c3 | b3 | × | — | 0.9 | E | F | G | 1.945 | 0.99 | 0.72 | No BN precipitation |
| | c4 | b4 | × | — | 0.5 | G | G | G | 1.948 | 0.97 | 0.71 | No BN precipitation |
| | c5 | b5 | × | — | 0.9 | D | G | G | 1.945 | 0.99 | 0.72 | No BN precipitation |
| | c6 | b6 | × | — | 0.9 | D | G | G | 1.947 | 0.96 | 0.70 | No BN precipitation |
| | c7 | b7 | × | — | 0.9 | C | D | G | 1.946 | 0.94 | 0.68 | No BN precipitation |
| | c8 | b8 | × | — | 15.0 | C | D | G | 1.945 | 0.93 | 0.68 | No BN precipitation |
| | c9 | b9 | × | — | 0.5 | D | E | G | 1.944 | 0.94 | 0.68 | No BN precipitation |
| | c10 | b10 | × | — | 1.3 | D | E | G | 1.943 | 1.03 | 0.75 | No BN precipitation |
| | c11 | b11 | × | — | 0.9 | C | E | G | 1.942 | 1.04 | 0.76 | No BN precipitation |
| | c12 | b12 | × | — | 0.9 | B | C | G | 1.922 | 1.06 | 0.77 | No BN precipitation |
| | c13 | b13 | × | — | 5.0 | E | F | G | 1.946 | 0.96 | 0.70 | No BN precipitation |
| | c14 | b14 | ○ | 30 | 1.2 | A | A | B | 1.946 | 0.92 | 0.73 | |
| | c15 | b15 | ○ | 500 | 1.3 | E | F | G | 1.921 | 0.96 | 0.78 | |

Example 2

First, a grain-oriented electrical steel sheet (product) was produced using the same method as in Example 1. Next, the magnetic domain control was performed for the product using a mechanical method, a laser, and an electron beam.

When the number density of BN was measured, the insulation coating was removed using sodium hydroxide from the grain-oriented electrical steel sheet obtained using the above-mentioned manufacturing method. Next, 10 visual fields were observed from the outermost surface of the intermediate layer having a cross-section perpendicular to the rolling direction of the steel sheet to 5 μm in a visual field of 4 μm in the sheet width direction×2 μm in the sheet thickness direction using SEM, and the number of BNs having a particle size of 50 nm or more and 300 nm or less was counted.

Also, using SEM-EDS, the average particle size was observed in 10 visual fields of 4 μm in the sheet width direction×2 μm in the sheet thickness direction, lengths of the major axes of the precipitates in the observed fields identified as BN using EDS were measured, and an average value thereof was taken as the average particle size.

Further, $I_{B\_t\,(d/100)}/I_{B\_t\,(d/10)}$ was measured using the same method as described above.

Table 3 shows a precipitation state of BN of the grain-oriented electrical steel sheet (product), the results of GDS, the evaluation of coating adhesion, and the magnetic characteristics. In the examples D1 to D5 within the scope of the present invention, the coating adhesion was more excellent and the magnetic characteristics were also excellent.

TABLE 3

| | No. | Steel No. | BN Number density (pieces/mm³) | BN Average particle size (nm) | $I_{B\_t(d/100)}/I_{B\_t(d/10)}$ | Coating adhesion 20 mm φ peeling area ratio | Coating adhesion 10 mm φ peeling area ratio | Coating adhesion 5 mm φ peeling area ratio | Magnetic flux density B8 (T) | Iron loss $W_{17/50}$ (W/kg) | Iron loss $W_{17/50}$ of magnetic domain control (W/kg) | Magnetic domain control method |
|---|---|---|---|---|---|---|---|---|---|---|---|---|
| Examples | D1 | B1 | 2 × 10⁶ | 80 | 1.3 | A | A | B | 1.947 | 0.88 | 0.63 | Laser irradiation groove |
| | D2 | B2 | 4 × 10⁶ | 120 | 1.5 | A | A | B | 1.950 | 0.86 | 0.62 | Laser irradiation groove |
| | D3 | B3 | 3 × 10⁶ | 130 | 3.0 | A | A | B | 1.951 | 0.85 | 0.61 | Gear groove |
| | D4 | B4 | 2 × 10⁶ | 90 | 1.1 | A | A | B | 1.949 | 0.89 | 0.59 | Etching groove |
| | D5 | B5 | 3 × 10⁶ | 100 | 5.1 | A | A | B | 1.945 | 0.88 | 0.65 | Electron beam |

Example 3

Grain-oriented electrical steel sheets (products) were produced using the same method as in Examples 1 and 2. Next, the magnetic domain control was performed for the products using a mechanical method, a laser, and an electron beam.

For the grain-oriented electrical steel sheets (products), a precipitation mode of BN, $I_{B\_t\,(d/100)}/I_{B\_t(d/10)}$, the coating adhesion, and the magnetic characteristics were measured. The results are shown in Table 4.

TABLE 4

| | No. | Steel No. | Presence or absence of BN precipitation | Average particle size of BN (nm) | GDS B emission intensity $I_{B\_t(d/100)}/I_{B\_t(d/10)}$ | Coating adhesion 20 mm φ peeling area ratio | Coating adhesion 10 mm φ peeling area ratio | Coating adhesion 5 mm φ peeling area ratio | Magnetic flux density B8 (T) | Iron loss $W_{17/50}$ (W/kg) | Iron loss $W_{17/50}$ of magnetic domain control (W/kg) | Magnetic domain control method |
|---|---|---|---|---|---|---|---|---|---|---|---|---|
| Examples | E1 | B1 | ○ | 70 | 18 | A | A | B | 1.951 | 0.87 | 0.61 | Laser irradiation groove |
| | E2 | B2 | ○ | 120 | 12 | A | B | B | 1.952 | 0.86 | 0.62 | Etching groove |
| | E3 | B3 | ○ | 300 | 16 | A | A | B | 1.949 | 0.87 | 0.63 | Gear groove |

TABLE 4-continued

| | | | | GDS | Coating adhesion | | | Magnetic characteristics | | | |
|---|---|---|---|---|---|---|---|---|---|---|---|
| No. | Steel No. | Presence or absence of BN precipitation | Average particle size of BN (nm) | B emission intensity $I_{B\_t(d/100)}/I_{B\_t(d/10)}$ | 20 mm φ peeling area ratio | 10 mm φ peeling area ratio | 5 mm φ peeling area ratio | Magnetic flux density B8 (T) | Iron loss $W_{17/50}$ (W/kg) | Iron loss $W_{17/50}$ of magnetic domain control (W/kg) | Magnetic domain control method |
| E4 | B4 | ○ | 250 | 15 | A | A | B | 1.952 | 0.88 | 0.62 | Electron beam |
| E5 | B5 | ○ | 200 | 17 | A | B | B | 1.948 | 0.86 | 0.60 | Electron beam |

In the examples E1 to E5 in which the ratio $I_{B\text{-}t(d/100)}/I_{B\text{-}t(d/10)}$ of the emission intensity of B on the surface layer of the steel sheet to the emission intensity of B on a center of the steel sheet (on a side closer to the base steel sheet that the surface layer of the steel sheet) satisfies the above Equation (1), the coating adhesion and the magnetic characteristics were more excellent.

INDUSTRIAL APPLICABILITY

As described above, according to the present invention, the peeling of the insulation coating generated at the strong bending processing part of the steel sheet serving as the inner circumferential side of the iron core can be inhibited in the grain-oriented electrical steel sheet using BN as an inhibitor, and it is possible to stably provide a grain-oriented electrical steel sheet having excellent insulation adhesion, a low iron loss, and excellent manufacturability as a wound steel core. Therefore, the present invention is highly applicable in manufacturing the electrical steel sheets and in industries utilizing them.

The invention claimed is:

1. A grain-oriented electrical steel sheet comprising:
   a base steel sheet;
   an intermediate layer which is disposed in contact with the base steel sheet and mainly includes silicon oxide; and
   an insulation coating which is disposed in contact with the intermediate layer and mainly includes phosphate and colloidal silica,
   wherein the base steel sheet contains, as a chemical compositions, by mass %:
   C: 0.085% or less;
   Si: 0.80 to 7.00%;
   Mn: 0.05 to 1.00%;
   acid-soluble Al: 0.010 to 0.065%;
   N: 0.0040% or less;
   S: 0.0100% or less;
   B: 0.0005 to 0.0080%; and
   a remainder of Fe and impurities,
   BN having an average particle size of 50 to 300 nm is present on a surface layer of the intermediate layer,
   when a total thickness of the base steel sheet and the intermediate layer is defined as d, a time until a sputtering depth reaches a position of d/100 from an outermost surface of the intermediate layer when an emission intensity of B is measured using glow discharge emission spectrometry (GDS) is defined as t(d/100), and a time until the sputtering depth reaches a position of d/10 from the outermost surface of the intermediate layer is defined as t(d/10),
   an emission intensity $I_{B\_t(d/100)}$ of B at t(d/100) and an emission intensity $I_{B\_t(d/10)}$ of B at t(d/10) satisfy the following Equation (1), and
   a ratio of a major axis to a minor axis of the BN particle is 1.5 or less, $$I_{B\_t(d/100)} > I_{B\_t(d/10)} \qquad \text{Equation (1)}.$$

2. The grain-oriented electrical steel sheet according to claim 1, wherein a number density of the BN particle on the surface layer of the intermediate layer is $2 \times 10^6$ pieces/mm² or more.

* * * * *